US008656796B2

(12) United States Patent
Janssen et al.

(10) Patent No.: US 8,656,796 B2

(45) Date of Patent: Feb. 25, 2014

(54) OPERATING ELEMENT MOVABLE BACK AND FORTH BY TRACTION ELEMENTS WOUND IN OPPOSITE DIRECTIONS ON WINDING BODIES

(75) Inventors: Thorsten Janssen, Velbert (DE); Bernd Gellhaus, Bochum (DE); Jai-Kwon Yu, Essen (DE)

(73) Assignee: Witte Automotive GmbH, Velbert (DE)

( * ) Notice: Subject to any disclaimer, the term of this patent is extended or adjusted under 35 U.S.C. 154(b) by 62 days.

(21) Appl. No.: 13/421,416

(22) Filed: Mar. 15, 2012

(65) Prior Publication Data

US 2012/0234115 A1 Sep. 20, 2012

(30) Foreign Application Priority Data

Mar. 18, 2011 (DE) ........................ 10 2011 001 390

(51) Int. Cl.
*F16H 27/02* (2006.01)
*F16H 29/02* (2006.01)

(52) U.S. Cl.
USPC ........................................................ 74/89.22

(58) Field of Classification Search
USPC .................................... 74/89.2, 89.21, 89.22
See application file for complete search history.

(56) References Cited

U.S. PATENT DOCUMENTS

| | | | | | |
|---|---|---|---|---|---|
| 3,134,324 | A | * | 5/1964 | Schwaninger | 101/269 |
| 3,546,925 | A | * | 12/1970 | Barton | 73/652 |
| 4,614,989 | A | * | 9/1986 | Kaczeus et al. | 360/267 |
| 4,813,292 | A | * | 3/1989 | Boyko | 74/89.2 |
| 6,370,974 | B1 | * | 4/2002 | Jourtchenko et al. | 74/89.22 |
| 2004/0237697 | A1 | * | 12/2004 | Kawakami | 74/501.6 |

FOREIGN PATENT DOCUMENTS

| | | |
|---|---|---|
| DE | 102005052665 | 7/2006 |
| DE | 102007027219 | 1/2008 |

* cited by examiner

*Primary Examiner* — Justin Krause

(74) *Attorney, Agent, or Firm* — Lucas & Mercanti, LLP; Klaus P. Stoffel

(57) ABSTRACT

An operating element with a drive motor equipped with a drive shaft, which can be driven in two opposite rotational directions to move an actuating element between two end positions by a motion transmission device. Each of two motion transmission devices includes a winding body, onto which a traction element is wound in the direction opposite to that in which the traction element of the other transmission device is wound. The free end of the traction element is attached to the actuating element.

9 Claims, 5 Drawing Sheets

Fig. 5
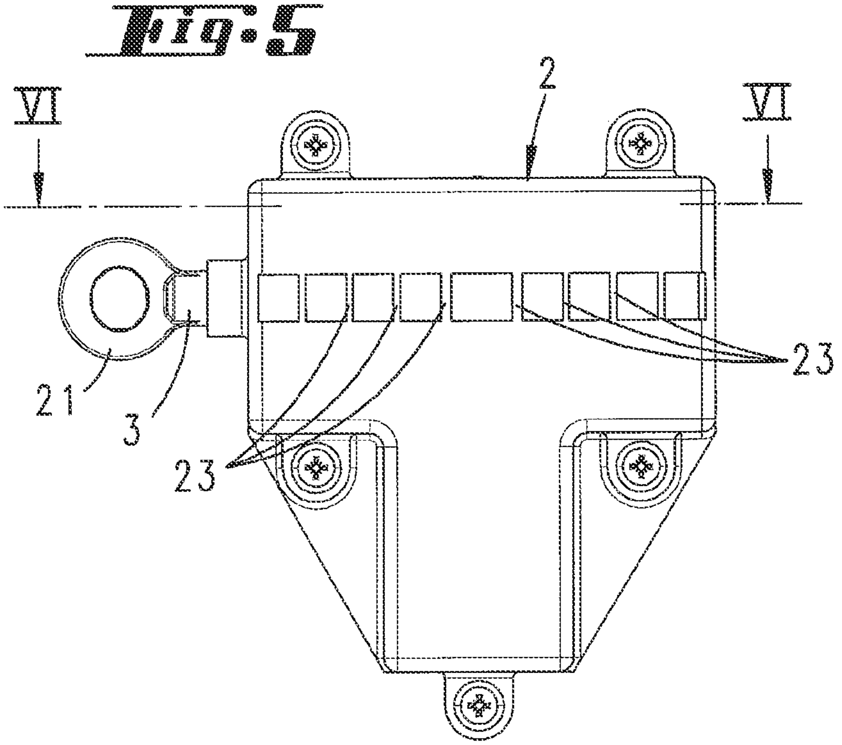
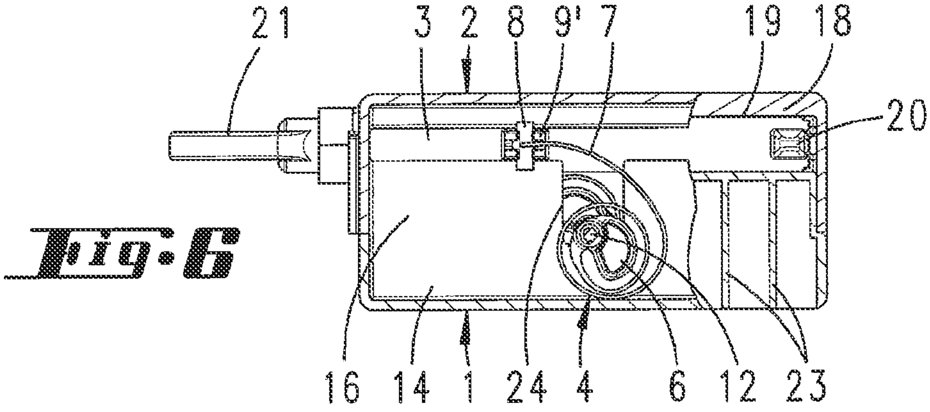
Fig. 6
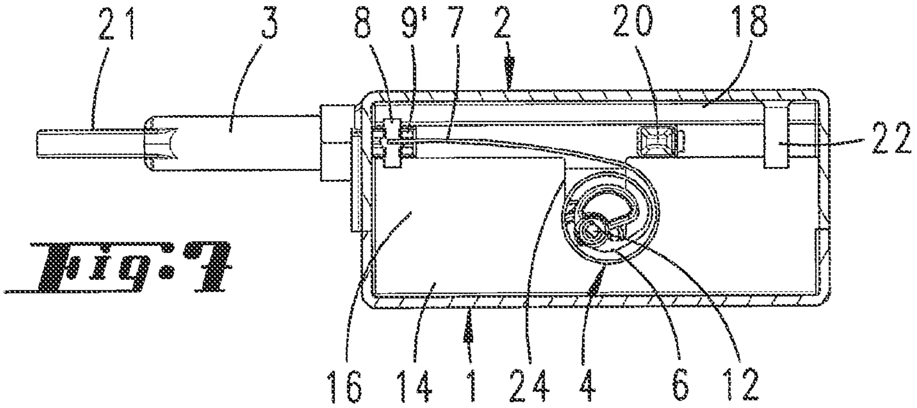
Fig. 7

OPERATING ELEMENT MOVABLE BACK AND FORTH BY TRACTION ELEMENTS WOUND IN OPPOSITE DIRECTIONS ON WINDING BODIES

The present application claims priority of DE 10 2011 001 390.3, filed Mar. 18, 2011, the priority of this application is hereby claimed and the application is incorporated herein by reference.

BACKGROUND OF THE INVENTION

The invention pertains to an operating element with a drive motor comprising a drive shaft, which can be driven in two opposite rotational directions to move an actuating element back and forth between two end positions by means of a motion transmission means.

An operating element is previously known from DE 10 2005 052665 A1. Here a motion transmission means acts on a pivot arm to shift it in a pivoting direction. The return movement is accomplished by a spring, which is put under tension during the original movement.

An operating element in which a motion transmission means forms a spindle drive, which can be driven by a drive motor acting on a reducing gear, is described in DE 102007027219A1.

SUMMARY OF THE INVENTION

The invention is based on the goal of simplifying the production technology required to produce an operating element.

The goal is achieved by the invention as described in the claims, wherein what is provided first and most importantly is that each of at least two motion transmission means comprises its own winding body, on each of which a traction element is wound in the direction opposite to that of the traction means on the other body, the free end of the traction element being fastened to the actuating element. When the drive motor turns in a first rotational direction, the traction element of one of the two winding bodies is wound up, and the actuating element is thus moved in a first direction. The other winding body is rotated in the same direction, but the traction element unwinds from the body. When the rotational direction of the drive motor is changed, the actuating element is shifted in the opposite direction. The traction element which was previously unwound from the winding body is now wound up onto the winding body, and the traction element which was previously wound up on the winding body is now unwound from the winding body. The traction element can be a cable, a wire, or a chain. Preferably, however, the traction element is a flat belt. The traction element can be wound helically onto the body. It can also be wound onto the body in spiral fashion. A spiral winding is achieved in particular when the traction element is a belt with two opposing wide surfaces, which, when wound up, either touch or pass around each other with a certain gap between the turns. One end of the traction element is permanently connected to the winding body. It can be made as an integral part of the material of the body. The other end, which forms the free end, is attached to the actuating element. The winding bodies are preferably seated on a common shaft. The winding bodies are thus situated next to each other. The shaft can be the take-off shaft of the drive motor. A small electric motor is preferably used as the drive motor, which changes its direction of rotation when its poles are reversed. The winding bodies can be driven without the use of a reducing gear. This means that the armature of the electric motor will be mounted on the same drive shaft as that on which the winding bodies are seated. The actuating element can be shifted in linear fashion. It can also be rotatable. The actuating element can thus be either a plunger or an adjusting wheel. The two free ends of the traction elements act on the actuating element at points a certain distance apart. The free ends can be attached to the actuating element by connecting means. For example, a connecting pin can be formed on the free end of the traction element. This connecting pin can fit into a connecting opening. Connecting pins preferably project from each of the two wide sides of the belt-like traction element, and each pin snaps into a connecting opening, which has a slot on one side, wherein the two connecting openings are formed by fastening elements which extend parallel to each other, project laterally from the actuating element, and create a gap between them, in which, in the connected state, the traction element is securely held. Latching elements are also preferably provided, by means of which the actuating element is held in one or the other of the two end positions. As a result, a latching force must be overcome when the actuating element is to be moved either into or out of the end position. It is sufficient, however, for the latching elements to be designed in such a way that the latch in question must overcome a latching force only when the element is being shifted out of the end position. It is essential for the actuating element to be held securely in the end position. In a preferred embodiment, latching tabs are provided, which cooperate with latching projections. The latter can be formed as extensions projecting away from the actuating element. Each of the two motion transmission means can reside in a chamber of a housing designed in particular to consist of two housing parts. The chambers can be separated from each other by a web formed in particular as a hollow body, wherein one long surface of the web forms a guide for a plunger, which serves as the actuating element. In a preferred embodiment, the traction element is formed by a belt formed as an integral part of the material of the winding body, which belt can be wound in spiral fashion onto the winding body. A motion transmission means of this type can be fabricated by injection-molding, wherein, during the injection-molding process, the belt is preformed along a spiral line. In the relaxed state, spaces remain between the individual turns of the winding.

The invention also pertains to a use of the previously described operating element in a latch. This use preferably involves a latch of a motor vehicle such as a glove compartment latch, a gas tank cover latch, or a side door lock. In the case of a use of this type, the operating element moves latching elements back and forth between a latched position and a release position. For this purpose, the actuating element can be designed as a plunger, which carries an eye on its free end, which can be connected to additional actuating elements to control the latch.

Additional possible uses of the operating element are rear hatch locks, seatback latches, hood locks, or storage compartment latches. Generally speaking, the operating element can be used on latching/unlatching systems, on positioning systems, and on adjusting systems.

BRIEF DESCRIPTION OF THE DRAWING

In the drawings:

FIG. 5 shows the closed housing, in a view looking toward the housing part;

FIG. 6 shows a cross section along line VI-VI of FIG. 5, wherein the housing is partially cut away in the area of the web;

FIG. 7 shows a diagram similar to that of FIG. 6 but with nothing cut away and with the actuating element shifted into the second end position;

DETAILED DESCRIPTION OF THE INVENTION

Figure 1:
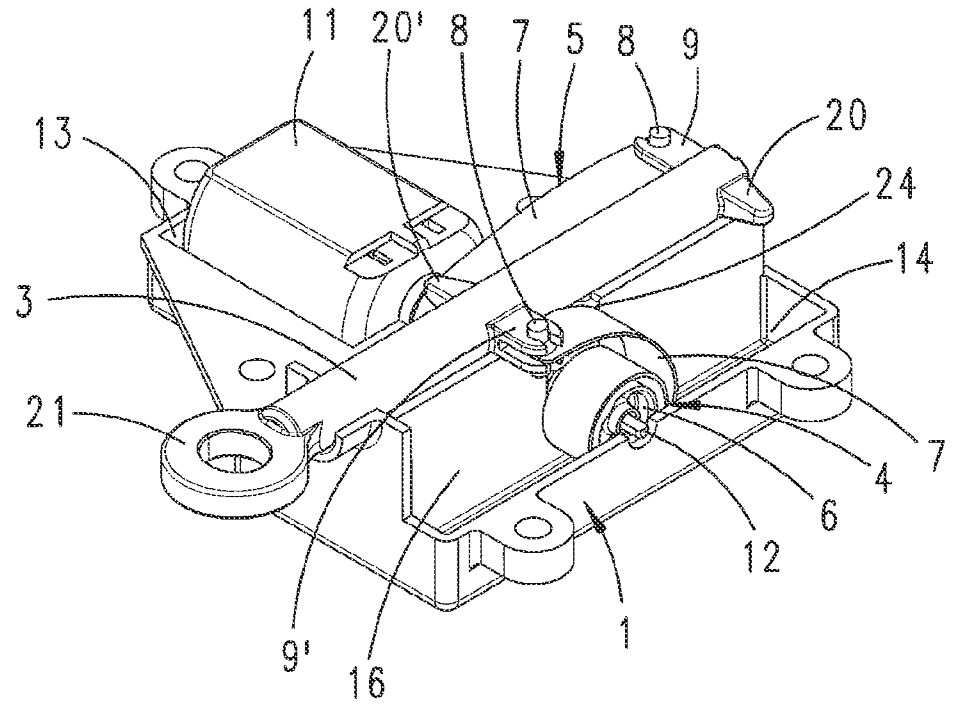
FIG. 1 shows a first perspective diagram of the operating element with the housing in the opened state and with the actuating element in a first end position.
Figure 2:
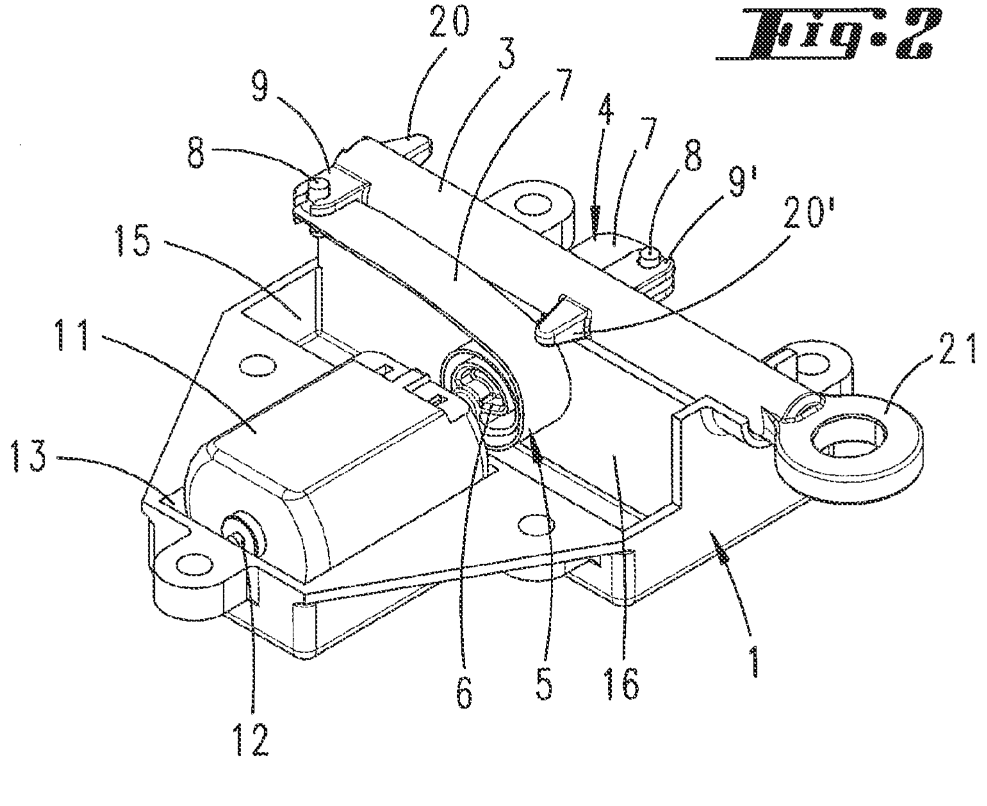
FIG. 2 shows a second perspective diagram of the operating element.
Figure 3:
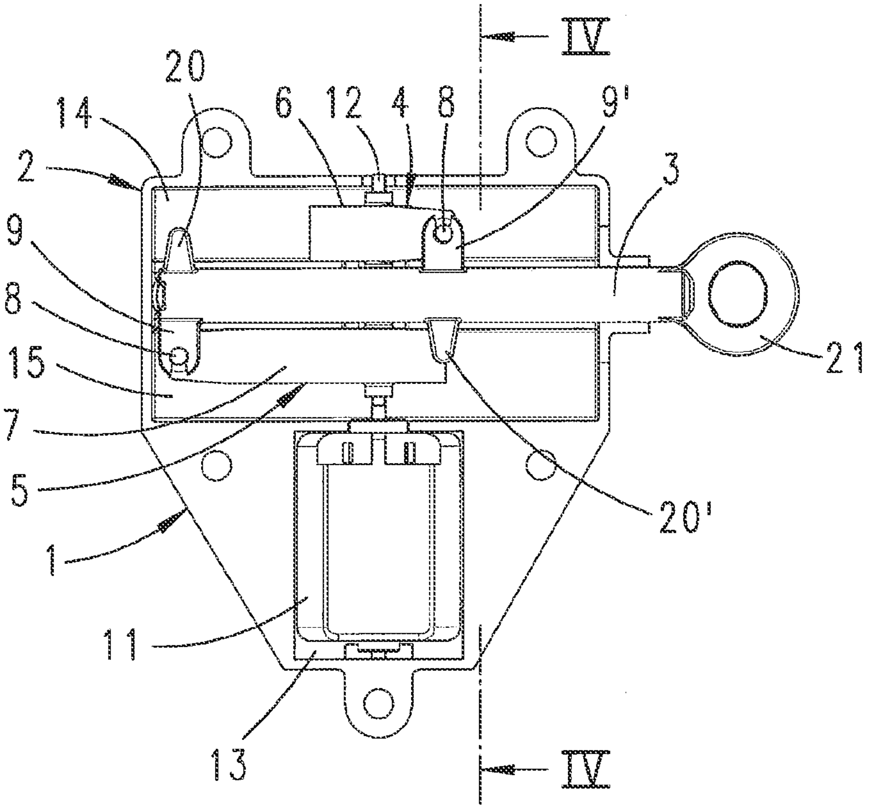
FIG. 3 shows a top view of the operating element in the first end position.
Figure 4:
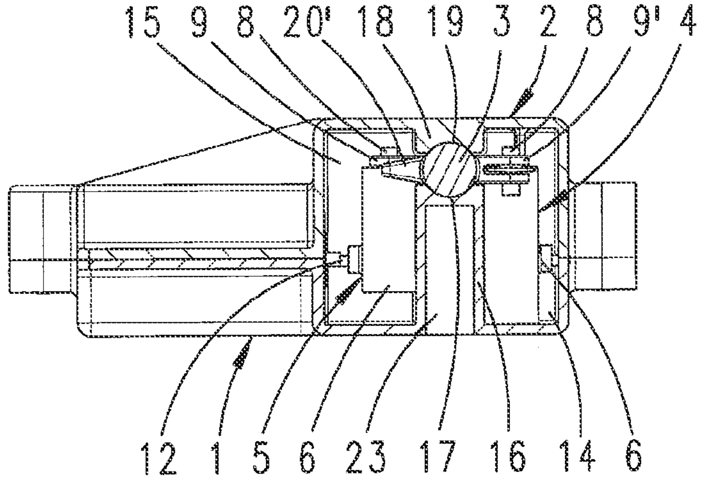
FIG. 4 shows a cross section along line IV-IV of FIG. 3.

The operating element has a housing consisting of two housing parts 1, 2, wherein each housing part 1, 2 comprises a housing shell with a support opening 13 for a drive motor 11 and two chambers 14, 15, separated by a web 16, 18, each of the chambers holding a motion transmission means 4, 5.

Figure 9:
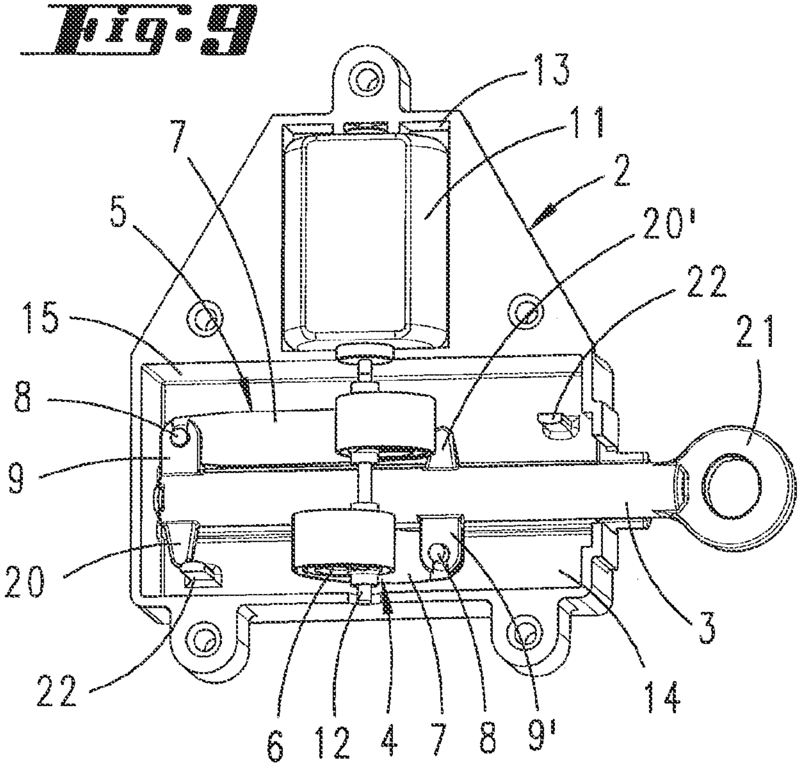
FIG. 9 shows the second housing part with the drive motor, actuating element, and motion transmission means in the first end position of the actuating element, all of these installed in the housing.
Figure 10:
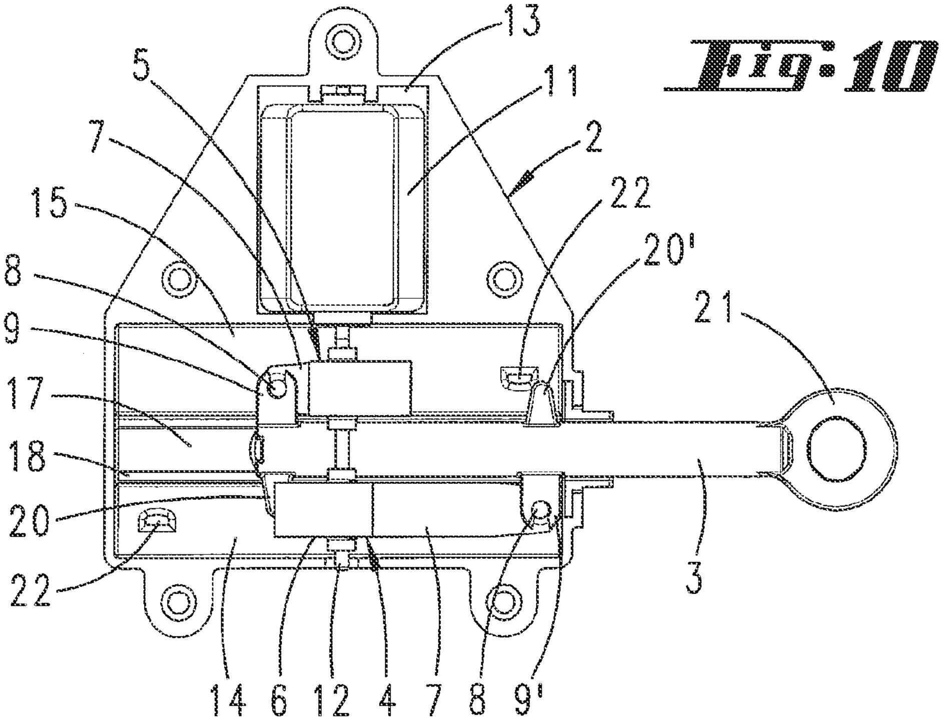
FIG. 10 shows a top view of the second housing part, equipped as in FIG. 9, in the second end position.

The latching tabs 22, which can be seen in FIGS. 9 and 10, project from the bottom of the chambers 14, 15 of the housing part 2. The long, narrow sides of the two webs 16, 18 form guides 17, 19 in the shape of rounded grooves.

The web formed by the housing part 2 is formed by a hollow body, which is divided by transverse webs 23 into a plurality of individual cavities, which are open toward the outside of the housing.

Between the two guides 17, 19 there is a round cylindrical plunger 3, which carries an eye 21 at the end projecting out of the housing 1, 2. At two different points a certain distance apart, fastening elements 9 and latching extensions 20 project from the plunger in opposite directions. A latching element 20, 20' lies opposite each fastening element 9, 9'.

The plunger 3 can be shifted back and forth between the first end position, shown in FIG. 9, and the second end position, shown in FIG. 10. In the two end positions, the plunger 3 is securely latched in place by the latching extension 20, which lies behind the latching tab 22. So that the plunger 3 can leave the first end position, shown in FIG. 9, the extension 20, designed as a latching projection, must bend the elastically formed latching tab 22. Upon reaching the second end position, shown in FIG. 10, the extension 20' passes over the latching tab 22 assigned to it, so that the plunger 3 is now also latched securely in the second end position.

The drive motor 11 installed in the support openings 13 of the housing parts 1, 2 is designed as a small electric motor and has a rotor formed by an armature. This can rotate in one direction or the other depending on the polarity of the drive motor 11. In the exemplary embodiment, the drive shaft 12 of the electric motor 11 serves simultaneously as the armature shaft. It is also provided, however, that the drive shaft 12 can be driven by way of a reducing gear. The drive shaft 12 has a non-circular cross section. In the exemplary embodiment, it has a D-shaped cross section. Two winding bodies 6 are seated on the drive shaft 12. The two winding bodies 6 lie next to each other but are a certain distance apart. The drive shaft 12 projects through an opening 24 in the web 16 formed by the housing part 2.

A motion transmission means 4, 5 is assigned to each of the two winding bodies 6; this transmission means also forms a belt 7, which can be wound up on the winding body 6. The two belts 7 are wound up on their assigned winding bodies 6 in opposite directions. The free end of each belt 7 is connected to one of the two fastening elements 9. For this purpose, the fastening elements 9 have two lobes, a short distance apart, which form connecting openings 10 with a slot on one side. The free end of the belt 7 carries connecting pins 8, which project away from the two wide side surfaces of the belt and which can be snapped into the connecting openings 10 in such a way that that the belt lies between the two fastening lobes.

Figure 8:
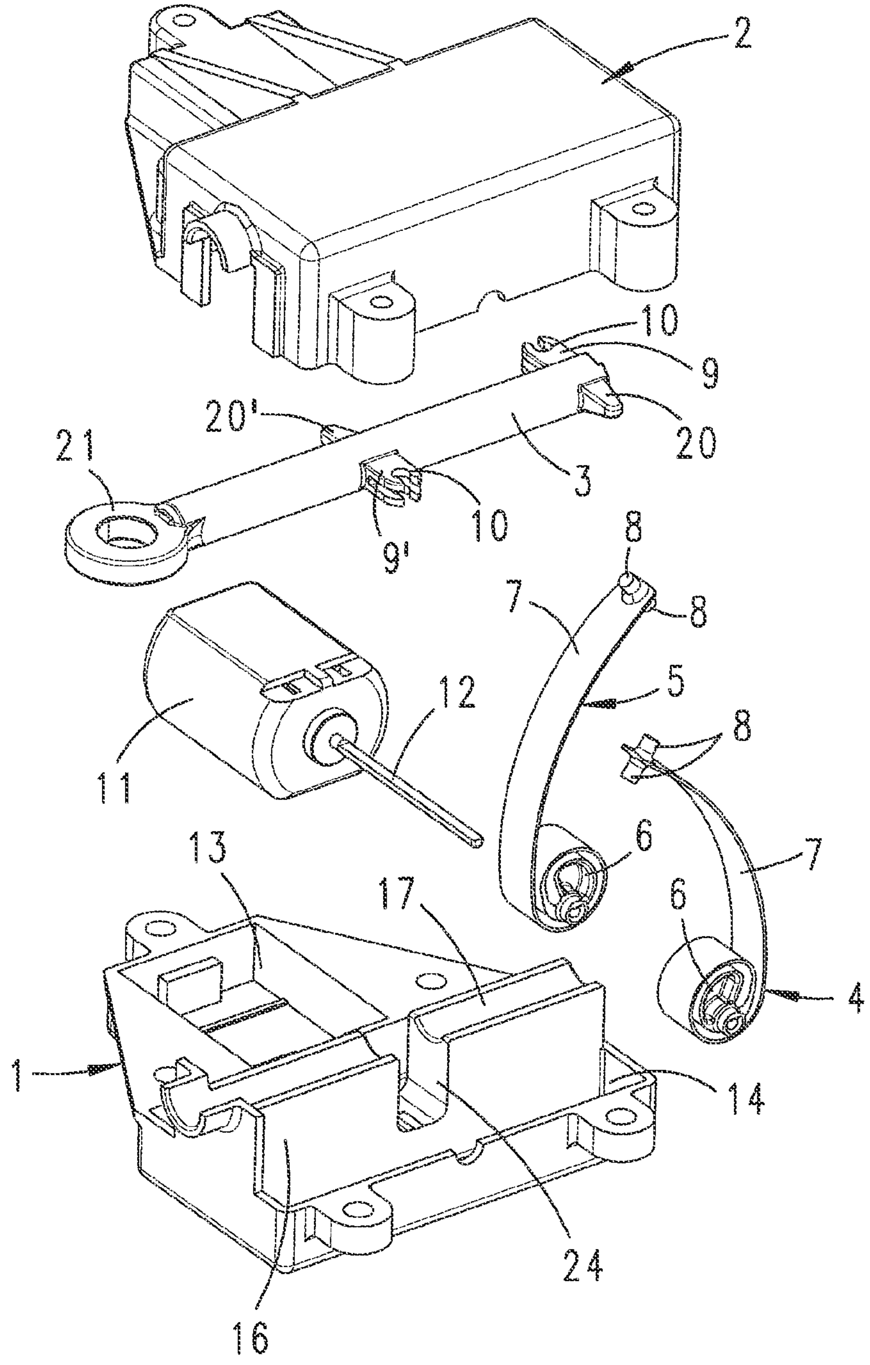
FIG. 8 shows an exploded diagram of the operating element.

The exploded diagram in FIG. 8 shows the two motion transmission means 4, 5 in their relaxed state. It can be seen that the winding body 6 comprises an insertion opening for the drive shaft 12 and comprises an eccentric contour. The belt 7 is molded as an integral part of the material of the winding body 6 and extends, when in the relaxed state, along a spiral line, wherein an air space remains between the individual turns. The two motion transmission means 4, 5 are produced in this state by the injection-molding process.

In the case of the exemplary embodiment, the belt 7 has a stiffness such that the individual turns do not touch each other or do so only slightly when in the installed state, so that the air space remains between the individual turns. This allows the motion to be transmitted smoothly from the drive shaft to the actuating element 3. The belt 7 thus serves the function of a spring element.

The operating element is assembled by seating the two winding bodies 6 of the motion transmission means 4, 5 on the drive shaft 12 of the drive motor 11 and by snapping the connecting pins 8 into their assigned connecting openings 10 on the plunger 3. During this process, the belts 7 must be slightly deformed. This structural unit can now be placed in one of the two housing parts 1, 2, which is then closed by the other housing part 2, 1. The two housing parts 1, 2 can be secured to each other by connecting screws.

By supplying the electric motor 11 with direct current in a first direction, the plunger 3 is moved into the first end position, which is shown in FIGS. 6 and 9. Thus the latching extension 20 passes over its assigned latching tab 22. During this shifting movement, the belt 7 of the motion transmission means 4 is wound up onto its assigned winding body 6. Conversely, the belt 7 of the motion transmission means 5 is unwound. To move the plunger 3 into the second end position shown in FIGS. 7 and 10, the electric motor 11 must be supplied with current in the opposite direction. Then the belt 7 assigned to the motion transmission means 5 is wound up on its assigned winding body 6, and the belt 7 assigned to the motion transmission means 4 is unwound from its assigned winding body 6. The electric motor 11 completes approximately one revolution during this shifting movement. In the case of an operating element of a different design (not shown), the electric motor can complete several revolutions during a shifting operation. When the plunger 3 is required to exert relatively strong forces, the electric motor 11 can comprise a reducing gear, by which the drive shaft 12 is driven.

Instead of the eye 21, the actuating element 3 could also comprises a different type of connecting member, which can connect it to a lever, a crank, a pulley, or some other mechanical part to operate a latching-and-unlatching system, a positioning system, or an adjusting system. Preferred latching-and-unlatching systems include rear hatch locks, seatback latches, hood locks, storage compartment locks, gas tank cover latches, side door latches, or the like on motor vehicles.

All of the disclosed features are essential (in themselves) to the invention. The disclosure content of the associated/attached priority documents (copy of the preliminary application) is thus included in their entirety in the disclosure of the present application, also for the purpose of incorporating features of these documents into claims of the present application. The subclaims characterize in their facultatively subordinate version independent inventive elaboration of the prior art, especially for the purpose of implementing partial applications on the basis of these claims.

List of Reference Numbers

| | |
|---|---|
| 1 | housing part |
| 2 | housing part |
| 3 | plunger, actuating element |
| 4 | motion transmission means |
| 5 | motion transmission means |
| 6 | winding body |
| 7 | belt, traction element |
| 8 | connecting pin |
| 9 | fastening element |
| 9' | fastening element |
| 10 | connecting opening |
| 11 | drive motor |
| 12 | drive shaft |
| 13 | support opening |
| 14 | chamber |
| 15 | chamber |
| 16 | web |
| 17 | guide |
| 18 | web |
| 19 | guide |
| 20 | latching extension, latching element |
| 20' | latching extension, latching element |
| 21 | eye |
| 22 | latching tab |
| 23 | rib |
| 24 | opening |

The invention claimed is:

1. An operating element, comprising: two motion transmission assemblies; an actuating element; a drive motor having a drive shaft that is drivable in two opposite rotational directions to move the actuating element between two end positions by way of the two motion transmission assemblies, wherein each of the two motion transmission means comprises a winding body, onto which a traction element is wound in a direction opposite to a direction in which the traction element of the other transmission assembly is wound, a free end of the traction element being attached to the actuating element; and a housing, wherein the two motion transmission assemblies are separated from each other by a web, and each transmission assembly lies in a separate chamber of the housing.

2. The operating element according to claim 1, wherein the winding bodies are seated next to each other on the drive shaft of the drive motor.

3. The operating element according to claim 1, wherein the drive motor is an electric motor, having a rotatable armature seated on the drive shaft.

4. The operating element according to claim 1, wherein the actuating element is a movable plunger or an adjusting wheel rotatable around a rotational axis.

5. The operating element according to claim 1, wherein the free ends of the traction elements act on points of the actuating element a certain distance apart.

6. The operating element according to claim 5, further comprising connecting elements at the free ends of the traction elements.

7. The operating element according to claim 1, wherein the housing is formed by two housing shells, which completely enclose the two chambers.

8. The operating element according to claim 1, wherein the traction element comprises a belt formed as an integral part of the winding body, which comprises an eccentric peripheral contour, where the belt is windable onto the winding body in spiral fashion.

9. The operating element according to claim 8, wherein the winding body and the belt formed as an integral part thereof are an injection-molded part.

* * * * *